United States Patent [19]

Uemura et al.

[11] Patent Number: 5,223,997
[45] Date of Patent: Jun. 29, 1993

[54] MONOLITHIC FLOATING MAGNETIC HEAD WITHOUT ADVERSE ADHESIVE EFFECTS

[75] Inventors: Norio Uemura; Shinji Furuichi; Akira Taguchi; Yasuo Kuriyama, all of Mooka, Japan

[73] Assignee: Hitachi Metals, Ltd., Tokyo, Japan

[21] Appl. No.: 686,529

[22] Filed: Apr. 17, 1991

[30] Foreign Application Priority Data

Apr. 24, 1990 [JP] Japan ................. 2-108317

[51] Int. Cl.$^5$ .......................... G11B 5/60; G11B 5/48; G11B 21/21
[52] U.S. Cl. ................................... 360/103; 360/104; 360/119
[58] Field of Search ............... 360/103, 104, 119, 126; 29/603

[56] References Cited

U.S. PATENT DOCUMENTS

| | | | |
|---|---|---|---|
| 4,204,235 | 5/1980 | Stollorz | 360/103 |
| 4,796,133 | 1/1989 | Kuriyama | 360/126 |
| 4,920,438 | 4/1990 | Furukawa et al. | 360/128 |
| 5,008,768 | 4/1991 | Carlson et al. | 360/104 |
| 5,027,238 | 6/1991 | Konishi et al. | 360/104 |

FOREIGN PATENT DOCUMENTS 58-117411 7/1983 Japan .
63-149812 6/1988 Japan .
3-209615 9/1991 Japan ................................... 360/103

OTHER PUBLICATIONS

Kaneko et al., "Compact, High Recording Density Magnetic Disk Storage", *Japan Telecommunications Review*, pp. 163-169, Apr. 1982.

*Primary Examiner*—Stuart S. Levy
*Assistant Examiner*—Jefferson Evans

[57] ABSTRACT

A floating magnetic head of a monolithic type which is arranged in such a manner that a magnetic circuit is constituted by a first magnetic core having an air bearing surface and a second magnetic core to which a wire is wound and being integrally connected with the first core via a magnetic gap, and the backside of the first core is, connected with an adhesive to a holding member of a cantilever holding structure provided for a load arm in such a manner that the longitudinal central axes of the first core and the holding member coincide with each other. The magnetic head has a groove which is formed on the backside of the first core thereof in such a manner that the groove substantially parallels a magnetic gap line, the groove confronts the holding member and the distance between the gap line and an edge line of the groove adjacent to the gap line is 2 to 20% of the entire length of the first and the second cores. Furthermore, no adhesive adheres to the second core.

6 Claims, 4 Drawing Sheets

MONOLITHIC FLOATING MAGNETIC HEAD WITHOUT ADVERSE ADHESIVE EFFECTS

BACKGROUND OF THE INVENTION

1. Field of the Invention

The present invention relates to a floating magnetic head held in an inline manner in an apparatus having a fixed magnetic disc(s), and, more particularly, to a monolithic type magnetic head revealing improved electromagnetic conversion characteristics and reliability.

2. Description of the Prior art

Hitherto, magnetic discs serving as magnetic a recording media have been mainly manufactured by coating oxide magnetic powder to an aluminum alloy substrate. However, recently, a fixed magnetic disc of a small size which is capable of recording data at high density, with the magnetic layer formed by a plating or a sputtering method, has been widely used.

As a floating magnetic head for use in a small fixed magnetic disc apparatus of the type described above, there has been available a monolithic type floating magnetic head arranged in such a manner that its a slider is made of a magnetic material, such as Mn-Zn ferrite, and the thus made slider constitutes a portion of a main magnetic circuit. As a result, the monolithic type floating magnetic head possesses a high inductance and shows high output voltage at reading. The floating type magnetic head can be held by a standard method in which the backside of a slider is bonded to a holding member, which is provided for a load arm supported in a cantilever manner, in such a manner that the longitudinal central axes of the slider and the holding member are made substantially perpendicular to each other. The floating type magnetic head can be held by an inline method in which the longitudinal axes of the slider and the holding member substantially coincide with each other. In recent years, the inline method has been widely employed in the small magnetic disc apparatus because a space saving advantage can be obtained.

FIG. 6 is a perspective view which illustrates a conventional monolithic type floating magnetic head which is shown in the form of a slider composed of magnetic cores 1 and 2. The magnetic core 1 having air bearing surfaces 3 (hereinafter sometimes called "ABS") and a center rail 4 and the magnetic core 2 having an aperture 12 for coil winding (omitted from illustration) are, by using a bonding glass, integrally connected to each other at the central rail 4 via a magnetic gap 13 holding a gap glass.

The standard method, which is one of the methods of holding the floating magnetic head structured as described above, is arranged in such a manner that the backside of the core 1 is, as shown in FIG. 7a is bonded to the holding member 5 in such a manner that the magnetic head is positioned perpendicularly to the holding member 5. Therefore, a reinforcing adhesive 16 is applied to intersection portions between the core 1 and the holding member 5 in such a manner that it is applied to the side surface of the core 1 and the lower surface (the lower surface when viewed in a state where the magnetic head is used) of the holding member 5. As a result, the bonding strength can be increased. Furthermore, the adhesive does not adhere to the core 2 on which the coil is wound since the gap line is positioned outside the holding member. Consequently, it has not been necessary to implement any special means for preventing the deterioration in the electromagnetic conversion characteristics due to the deformation in a recessed shape taken place in a portion adjacent to the magnetic gap of the center rail.

The floating magnetic head is positioned in soft contact with the magnetic disc by the biased force of a spring when the rotation of the magnetic disc is stopped. However, air on the disc surface is moved when the disc is being rotated, causing force capable of floating the subject side of the slider to be generated. As a result, the floating magnetic head floats by about 0.2 to 0.3 $\mu$m. If the magnetic head can be stably floated by a predetermined height, stable electromagnetic conversion characteristics at the time of performing the recording and reading operations can be obtained.

However, the conventional inline method has been arranged in such a manner that only the backside of the core having ABS and the surface of the holding member are connected to each other by an adhesive without special measures for reinforcing the bonding strength (as disclosed in, for example, Japanese Patent Publication JP-A-63-149812). Therefore, satisfactorily high bonding strength cannot be realized in comparison to that obtainable from the standard method. If an excessive quantity of the adhesive is applied for the purpose of increasing the bonding strength, a problem arises in that the adhesive will pass the gap line and the same undesirably adheres to the core 2 on which the coil is formed. If the adhesive adheres to the core on which the coil is wound, the core of the monolithic magnetic head is undesirably pulled toward the holding member. Consequently, a problem arises in that a deformation in a recessed shape takes place in a portion adjacent to the magnetic gap of the center rail, causing the electromagnetic conversion characteristics of the magnetic head to be deteriorated.

FIGS. 8a and 8b illustrate the relationship between the position of the monolithic type floating magnetic head to which the adhesive is applied and the quantity of deformation in a recessed shape (designated by a phantom line) taken place in the portion adjacent to the magnetic gap of the center rail. The magnetic head, that is, the slider comprises the core 1 made of polycrystals of Mn-Zn ferrite and having ABS, the slider being arranged in such a manner that the entire length is 5 mm, the width is 3.5 mm and the height is 1.3 mm. The slider further comprises the core 2 on which a coil is wound. Referring to FIGS. 8a and 8b, numeral 0 (zero) on the axis of abscissa shows the position of the gap line, $-0.3$ mm shows the position the end line or boundary line of adhesive on the core 2 which is positioned away from the gap line by a distance of 0.3 mm and $+0.3$ mm shows the position of the same on the core 1 which is positioned away from the gap line by a distance of 0.3 mm. The axis of ordinate stands for the quantity of the deviation of a portion around the magnetic gap of the center rail of the magnetic head. The dark section shows the maximum and the minimum values of the quantity of the deformation. If the adhesive adheres on the core 2 at the portion of 0.3 mm distance from the gap line, the maximum quantity ($\Delta x$ $\mu$m) of the deformation will become larger than a quantity of 0.01 $\mu$m which is estimated to be an allowable limit and which does not influence the electromagnetic conversion characteristics.

In order to overcome the above-described problems experienced with the inline method, a structure has been disclosed in JP-A-63-149812 in which a groove is longitudinally formed along the central axis of a magnetic core having ABS whereby the bonding strength is increased. According to this disclosure, although satisfactorily high bonding strength can be obtained, the adhesion of the adhesive to the core on which the coil is wound cannot be prevented completely. Namely, a flow of the adhesive in the longitudinal direction cannot be prevented. Therefore, the above described problems have not heretofore been overcome.

SUMMARY OF THE INVENTION

In order to overcome the above-described problems, an object of the present invention is to provide a floating magnetic head of a monolithic type which is arranged in such a manner that a magnetic circuit is constituted by a first magnetic core having air bearing surfaces and a second magnetic core to which a wire is wound and, being integrally connected with the first magnetic core via a magnetic gap, and a backside of the first magnetic core is, connected to a holding member of a cantilever holding structure provided for a load arm in such a manner that the longitudinal central axes of the first magnetic core and the holding member coincide with each other, the floating magnetic head comprising: a groove formed on the backside of the first magnetic core of the magnetic head, the groove being formed in such a manner that the groove is substantially parallel to a magnetic gap line and, confronts the holding member, and the distance between the magnetic gap line and an edge line of the groove adjacent to the magnetic gap line is 2 to 20% of the entire length of the first and the second magnetic cores.

The floating magnetic head according to the present invention is arranged in such a manner that a core having ABS, in which a groove is formed in parallel to the magnetic gap line, is disposed on the backside of the floating magnetic head which is made to adhere to the holding member. As a result, the undesirable introduction of the adhesive into the core, on which a coil is wound, can be prevented by the presence of the groove. Furthermore, the adhesive which has been introduced into the groove, will adhere to the side and bottom surfaces of the groove, causing the bonding strength to be increased.

The distance between the magnetic gap line and the edge line of the groove is limited to a range between 2 to 20% of the entire length of the first and the second cores. The reason for this is that, if the edge line of the groove is too close to the gap line, chipping or cracks will be generated in the first core having ABS when the groove is formed. If the groove is positioned excessively away from the gap line, the overall bonding area will be reduced, causing the bonding strength to be lowered.

Further objects, features and advantages of the invention will be appear more fully from the following description.

DESCRIPTION OF THE PREFERRED EMBODIMENT

Figure 1:
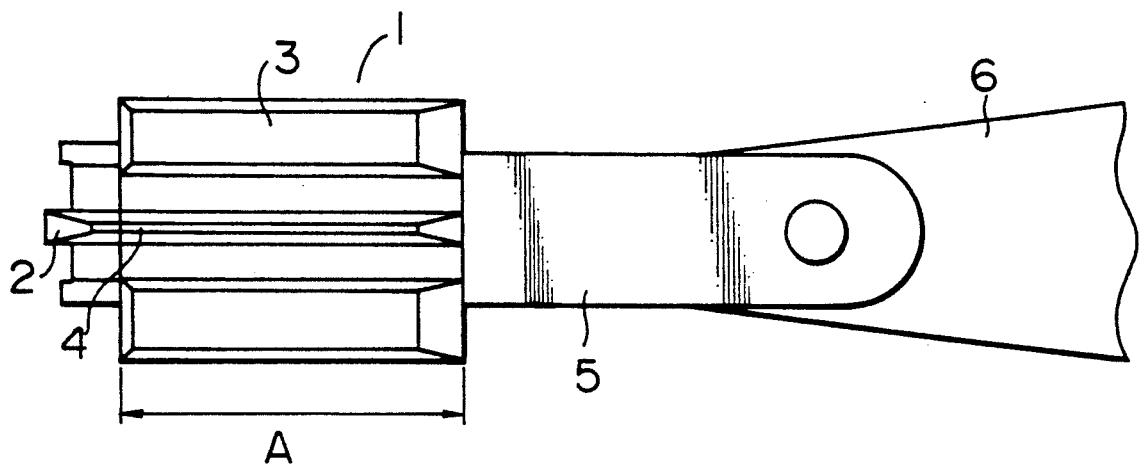
FIG. 1 is a top view which illustrates an inline type monolithic magnetic head according to the present invention.
Figure 2A:
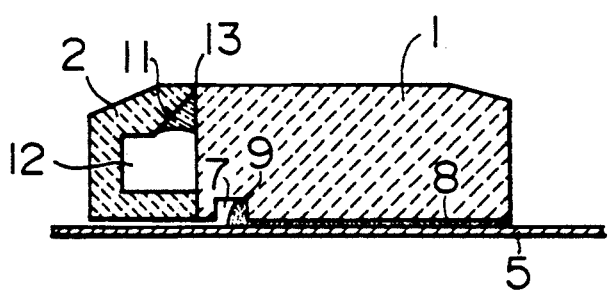
FIG. 2a is a cross sectional view which illustrates a state of bonding realized according to the present invention.
Figure 3:
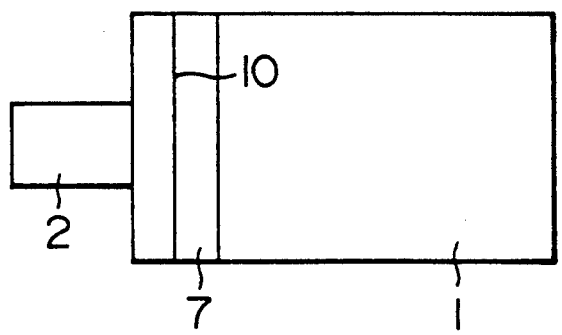
FIG. 3 is a backside view of the magnetic head according to the present invention.

FIG. 1 illustrates a monolithic type magnetic head according to the present invention and adapted to an inline system. Referring to FIGS. 1 and 2a, the inline type magnetic head comprises a core 1 having ABS and a core 2 being integrally connected with the core 1 by means of a glass 11 via a magnetic gap 13 and having a wire (omitted from illustration) wound thereto. The backside of the core 1 is attached to on a holding member 5 fastened to a cantilever type load arm 6 in such a manner that their longitudinal central axes substantially coincide with each other. As shown in FIGS. 2a and 3, the core 1 has, on the backside thereof, a groove 7 running substantially parallel to a gap line.

Figure 2B:
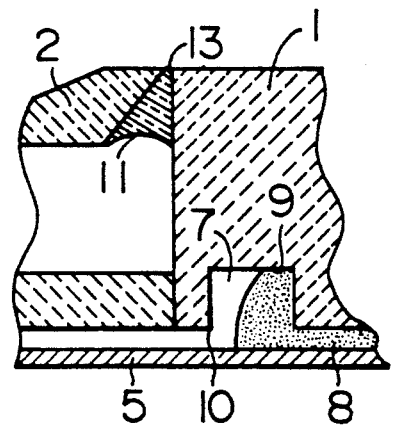
FIG. 2b is an enlarged partial view of the bonding state shown in FIG. 2a which illustrates an essential portion of the same.

FIG. 2b is an enlarged view of FIG. 2a, where an essential portion of the adhesive area is illustrated. Referring to FIG. 2b, a part 9 of an adhesive 8 for bonding the holding member 5 to core 1 exists in the groove 7 so that it adheres to the backside and the bottom surface of the groove 7.

EXPERIMENT 1

The state of the adhesion and the quantity of deformation was confirmed by using a magnetic head comprising the core 1 having ABS and made of Mn-Zn polycrystal ferrite, the core 1 having ABS being arranged in such a manner that the entire length of a slider, which comprises the cores 1 and 2, was 5 mm, the width was 3.5 mm and the height was 1.3 mm. The magnetic head further comprises the core 2 having a wire wound thereto.

The magnetic head according to the present invention had a groove on the backside of its core 1 having ABS, the groove being arranged in such a manner that the distance between the gap line 13 and the edge line 10 of the groove was 0.1 mm (the ratio with respect to the entire length of the slider: 2.0%), the width of the open portion of the groove was 0.5 mm, the depth was 0.05 mm and the cross sectional shape of it was formed substantially rectangular.

Figure 4A:
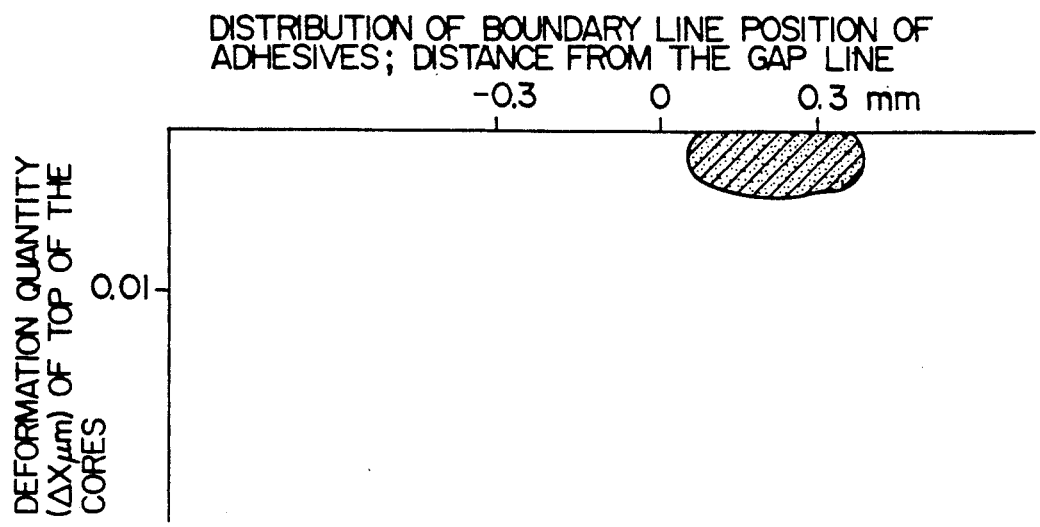
FIG. 4a is a graph which illustrates the quantity of deformation of a portion around a gap of a center rail according to the present invention, which relates to FIG. 4b.
Figure 4B:
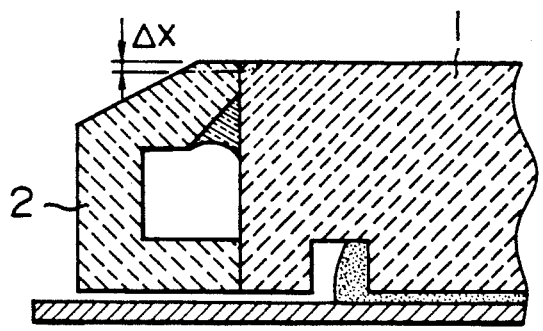
FIG. 4b is a vertical sectional view of a magnetic head according to the present invention.
Figure 8A:
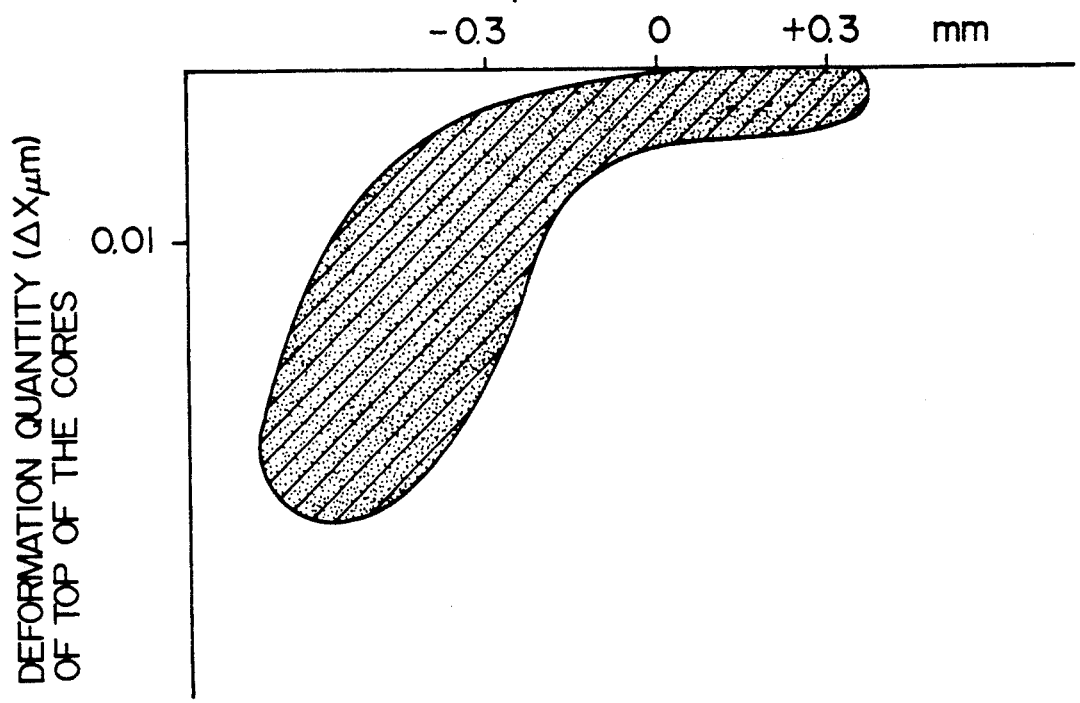
FIG. 8a illustrate the quantity of deformation of a portion around the magnetic gap of the center rail of the conventional inline-type magnetic head.
Figure 8B:
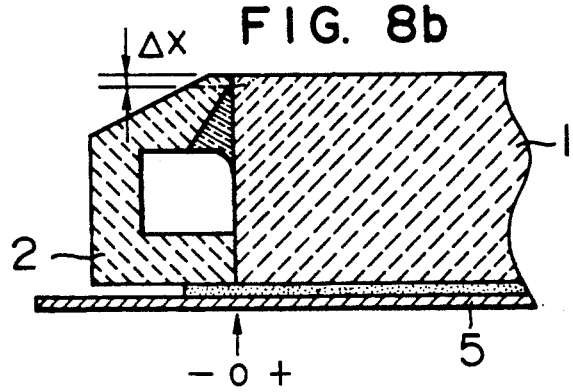
FIG. 8b is a vertical sectional view of a conventional magnetic head.

FIGS. 4a and 4b illustrate the relationship between the state of the adhesive adhered to the cores 1 and 2 and the deformation of a portion around the magnetic gap of a center rail. Similar to FIG. 8a, numeral 0 (zero) on the axis of abscissa shows the position of the gap line, −0.3 mm shows the position of the end of adhesive on the core 2 which is positioned away from the gap line by a distance of 0.3 mm and +0.3 mm shows the position of the same of the core 1 which is positioned away from the gap line by a distance of 0.3 mm. The axis of ordinate represents; the quantity of the deviation of a portion around the magnetic gap of the center rail. As shown in FIGS. 4a, and 4b, adhesion of the adhesive to the core 2 after the gap line can be prevented. Furthermore, the deviation of the portion around the gap line of the center rail was substantially 0.01 mm or less. Therefore, there was no influence upon the electromagnetic conversion characteristics.

EXPERIMENT 2

Figure 5:
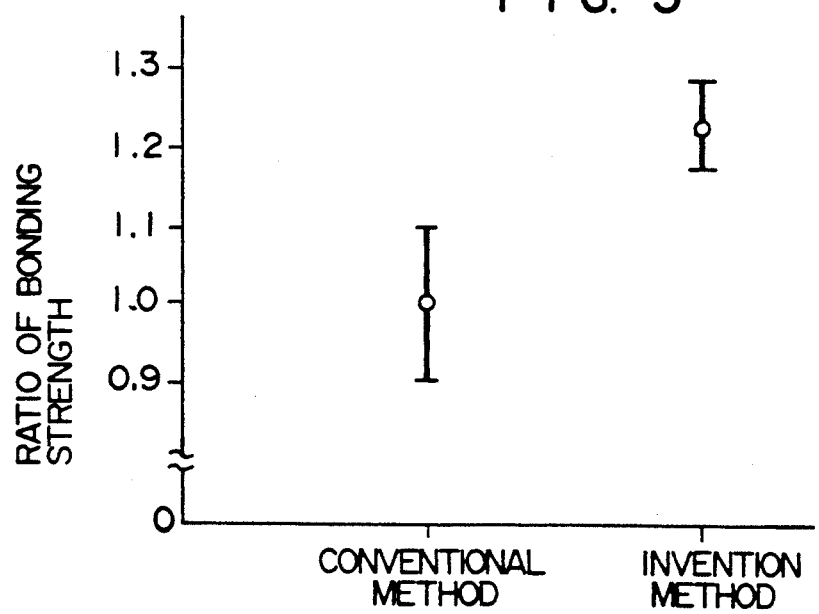
FIG. 5 is a graph illustrating a result of a comparison made between the adhesive strength according to the conventional structure and that according to the present invention.
Figure 6:
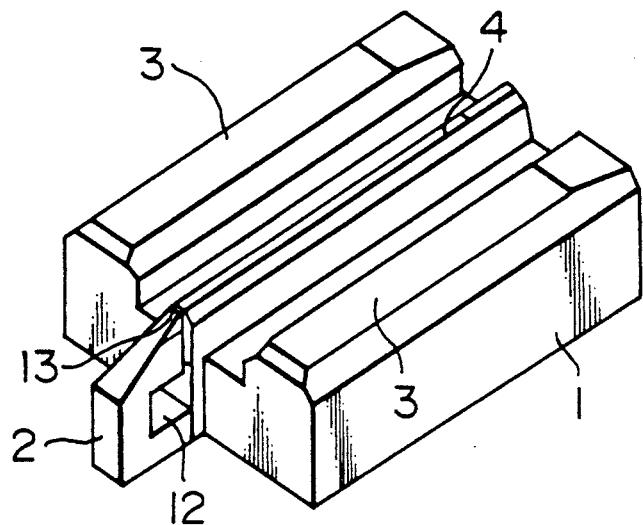
FIG. 6 is a perspective view which illustrates a known monolithic type magnetic head.
Figure 7A:
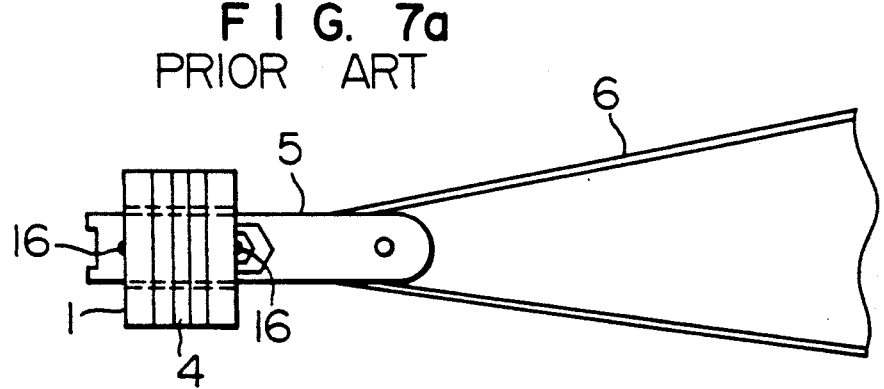
FIG. 7a is a top view which illustrates a standard type magnetic head.
Figure 7B:
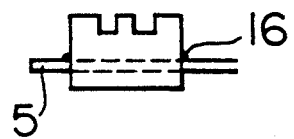
FIG 7b is a partial side view of the head of FIG. 7a illustrating a state of adhesion.

FIG. 5 relates to the monolithic floating magnetic head supported in the inline manner. FIG. 5 illustrates the result of a comparison made between the bonding strength achieved according to the conventional adhering method and that achieved according to the present invention in which the groove is formed on the backside of the magnetic core having ABS. The size of the core having ABS of each of the magnetic heads was the same as that according to Experiment 1. The magnetic head according to the present invention has a groove on the backside thereof, the groove being arranged in such a manner that the distance between the edge line of the groove and the gap line was 0.3 mm, the depth was 0.1 mm and the width of the open portion of the groove was 0.5 mm. The average bonding strength realized in the structure according to the present invention was 1.2, improved by about 20% in comparison to 1 (one) which is the mean value of the conventional bonding strength. Furthermore, the dispersion of the bonding strength can be reduced. The latter effect can be obtained from a fact that the bonding area can be assuredly made constant because the adhesive overflows into the groove.

The present invention is not limited to the above description about the position and the dimensions of the groove. The necessity lies in that the distance between the gap line and the edge line of the groove adjacent to the gap line is 2 to 20% of the entire length of the slider, the width of the opening portion of the groove is 0.1 to 1 mm and the depth is 0.01 to 0.3 mm. In any of the above-described structures, a monolithic type floating magnetic head was obtained which revealed improved bonding strength, reduced quantity of deformation of a portion around the magnetic gap of the center rail and improved electromagnetic conversion characteristics.

The shape of the groove is not limited to that according to the above-described embodiments. For example, a similar effect can be obtained from a groove having a semicircular cross sectional shape and that having an elliptic cross sectional shape. Furthermore, the present invention may be adapted to a magnetic head having one or more grooves formed along the longitudinal central axis of the backside of the core having ABS.

As will be apparent from the above, according to the present invention, there is provided a monolithic type floating magnetic head for use in a fixed type magnetic disc apparatus of a high recording density and small size, the monolithic type floating magnetic head according to the present invention revealing high adhesive force realized between the core having ABS and the holding member. Furthermore, deformation of a portion adjacent to the magnetic gap of the center rail of the magnetic head due to the influence from the adhesive and the deformation in a recessed shape can be prevented. In addition, the magnetic head according to the present invention reveals improved electromagnetic conversion characteristics and thereby reveals reliability.

Although the invention has been described in its preferred form with a certain degree of particularly, it is understood that the present disclosure of the preferred form could be changed in the details of construction and the combination and arrangement of parts may be resorted to without departing from the spirit and the scope of the invention as hereinafter claimed.

What is claimed is:

1. A floating magnetic head of a monolithic type which is arranged in such a manner that a magnetic circuit is constituted by a first magnetic core having an air bearing surface and a second magnetic core to which a wire is wound and being integrally connected with the first magnetic core via a magnetic gap, and wherein a backside of the first magnetic core is connected with an adhesive to a holding member of a cantilever holding structure provided for a load arm in such a manner that the central longitudinal axes of the first magnetic core and the holding member coincide with each other, the floating magnetic head comprising:

a groove formed on the backside of the first magnetic core of the magnetic head, the groove being substantially parallel to a magnetic gap line and confronting the holding member, and wherein the distance between the magnetic gap line and an edge line of the groove adjacent to the magnetic gap line is 2 to 20% of the entire length of the first and the second magnetic cores.

2. A floating magnetic head according to claim 1, wherein an adhesive for connecting the holding member and the first magnetic core to each other is introduced into the groove, wherein no adhesive adheres to the second magnetic core.

3. A floating magnetic head according to claim 2 wherein the adhesive adheres to a side and bottom of the groove such that bonding strength is increased between the first magnetic core and the holding member.

4. A floating magnetic head according to claim 1, wherein the width of the open portion of the groove is 0.1 to 1 mm and the depth of the groove is 0.01 to 0.3 mm.

5. A floating magnetic head according to claim 4, wherein an adhesive for connecting the holding member and the first magnetic core to each other is introduced into the groove, wherein no adhesive adheres to the second magnetic core.

6. A floating magnetic head according to claim 5, wherein the adhesive adheres to a side and bottom of the groove such that bonding strength is increased between the first magnetic core and holding member.

* * * * *

UNITED STATES PATENT AND TRADEMARK OFFICE
CERTIFICATE OF CORRECTION

PATENT NO. : 5,223,997

DATED : JUNE 29, 1993

INVENTOR(S) : Norio UEMURA, et al.

It is certified that error appears in the above-identified patent and that said Letters Patent is hereby corrected as shown below:

```
TITLE PAGE [57] ABSTRACT, line 7, "is," should be --is--.

Col. 1,    line 14,  "a" should be deleted;
           line 24,  "a" should be deleted;
           line 31,  "the backside of a" should be --a
                      backside of the--;
           line 55,  "is" should be deleted.

Col. 2,    line 29,  "coil" should be --core 2--;
           line 53,  "mm" should be --mm,--.

Col. 3,    line 19,  "and," should be --and--;
           line 21,  "connected to" should be --connected with
                      an adhesive to--;
           line 30,  "and," should be --and--;
           line 59,  "be" should be deleted.

Col. 4,    line 22,  "illustrate" should be --is a graph
                      illustrating--;
           line 37,  "on" should be deleted.
```

UNITED STATES PATENT AND TRADEMARK OFFICE
CERTIFICATE OF CORRECTION

PATENT NO. : 5,223,997
DATED : JUNE 29, 1993
INVENTOR(S) : Norio UEMURA, et al.

It is certified that error appears in the above-identified patent and that said Letters Patent is hereby corrected as shown below:

Col. 5, line 8, "of 0.3 mm" should be --of 0.3 mm,--;
line 11, "represents;" should be --represents--;
line 13, "4a," should be --4a--;
line 34, "mm" should be --mm,--.

Signed and Sealed this

Twenty-third Day of August, 1994

Attest:

BRUCE LEHMAN

Attesting Officer  Commissioner of Patents and Trademarks